US008864092B2

(12) United States Patent
Newville

(10) Patent No.: US 8,864,092 B2
(45) Date of Patent: Oct. 21, 2014

(54) TELEVISION MOUNT ASSEMBLY

(76) Inventor: Brian Newville, Oceanside, CA (US)

( * ) Notice: Subject to any disclaimer, the term of this patent is extended or adjusted under 35 U.S.C. 154(b) by 524 days.

(21) Appl. No.: 12/850,089

(22) Filed: Aug. 4, 2010

(65) Prior Publication Data

US 2012/0032062 A1 Feb. 9, 2012

(51) Int. Cl.
| | |
|---|---|
| A47F 5/00 | (2006.01) |
| A47F 5/02 | (2006.01) |
| F16M 13/00 | (2006.01) |
| F16M 11/08 | (2006.01) |
| F16M 11/20 | (2006.01) |
| F16M 11/24 | (2006.01) |
| F16M 13/02 | (2006.01) |

(52) U.S. Cl.
CPC ............. *F16M 13/02* (2013.01); *F16M 11/08* (2013.01); *F16M 2200/063* (2013.01); *F16M 11/2092* (2013.01); *F16M 11/24* (2013.01); *F16M 2200/044* (2013.01); *Y10S 248/917* (2013.01); *Y10S 248/918* (2013.01); *Y10S 248/919* (2013.01); *Y10S 248/92* (2013.01); *Y10S 248/921* (2013.01); *Y10S 248/922* (2013.01); *Y10S 248/923* (2013.01)
USPC ........... 248/317; 248/323; 248/325; 248/575; 248/576; 248/917; 248/918; 248/919; 248/920; 248/921; 248/922; 248/923; 248/123.11; 248/124.1; 248/125.1; 248/125.2; 248/278.1; 248/281.11; 248/292.11; 248/292.13; 248/280.11; 248/162.1; 248/297.11; 361/681

(58) Field of Classification Search
USPC ......... 248/317, 323, 325, 575–576, 917, 919, 248/922–923, 123.11, 278.1, 281.11, 248/292.11, 292.13, 324, 280.11, 162.1, 248/297.11, 124.1, 125.1–125.2; 361/681
See application file for complete search history.

(56) References Cited

U.S. PATENT DOCUMENTS

| | | | |
|---|---|---|---|
| 2,090,439 A | | 8/1937 | Carwardine |
| 2,630,854 A | | 3/1953 | Neher |
| 4,076,351 A | | 2/1978 | Wyant |
| 4,082,244 A | * | 4/1978 | Groff ........................ 248/280.11 |
| 4,561,674 A | * | 12/1985 | Alessio ......................... 280/655 |
| 4,691,886 A | | 9/1987 | Wendling et al. |
| 5,108,063 A | * | 4/1992 | Koerber et al. ............. 248/284.1 |
| 5,299,993 A | * | 4/1994 | Habing ............................ 482/52 |
| 5,499,956 A | * | 3/1996 | Habing et al. ................... 482/52 |
| 5,738,316 A | * | 4/1998 | Sweere et al. ............ 248/123.11 |
| 5,826,846 A | * | 10/1998 | Buccieri et al. .......... 248/280.11 |

(Continued)

FOREIGN PATENT DOCUMENTS

GB 2222939 3/1990

*Primary Examiner* — Christopher Garft
(74) *Attorney, Agent, or Firm* — Todd J. Langford; Eric A. Hanscom

(57) ABSTRACT

A television mount assembly suitable for mounting a television to a wall, especially over fireplaces and other obstacles. The mount assembly secures a television (TV) to a wall via two arms and a spring mechanism thereby allowing it to extend away from the wall while at the same time allowing the television to swivel. It includes a mechanism to straighten the television as it is positioned close to the wall. The spring mechanism is calibrated by means of a calibration screw, spring block, and locking screws. A handle enables a user to grasp the mount assembly for changing the position of the television. A temperature gauge on the handle displays ambient temperature proximate to the television to warn users if the temperature is too high for the television to safely operate. A means of setting a maximum extension prevents the television from extending beyond a point set by the user.

21 Claims, 14 Drawing Sheets

(56) References Cited

U.S. PATENT DOCUMENTS

| | | | |
|---|---|---|---|
| 5,876,008 | A | 3/1999 | Sweere et al. |
| 6,419,196 | B1 | 7/2002 | Sweere et al. |
| 6,523,796 | B2 | 2/2003 | Abramowsky et al. |
| 6,592,090 | B1 * | 7/2003 | Li .................. 248/284.1 |
| 6,695,274 | B1 | 2/2004 | Chiu |
| 6,889,404 | B2 * | 5/2005 | Lu et al. ............... 16/287 |
| 6,905,101 | B1 | 6/2005 | Dittmer |
| 7,014,157 | B2 * | 3/2006 | Oddsen ............. 248/280.11 |
| 7,252,277 | B2 | 8/2007 | Sweere et al. |
| 7,290,744 | B2 * | 11/2007 | Baldasari ............. 248/218.4 |
| 7,300,029 | B2 | 11/2007 | Petrick et al. |
| 7,395,996 | B2 | 7/2008 | Dittmer |
| 7,398,950 | B2 * | 7/2008 | Hung ................. 248/276.1 |
| 7,546,745 | B2 | 6/2009 | Lee et al. |
| 7,562,851 | B2 * | 7/2009 | Hein et al. .......... 248/281.11 |
| 8,072,739 | B2 * | 12/2011 | Dittmer ............... 361/679.01 |
| 8,074,950 | B2 * | 12/2011 | Clary ................. 248/280.11 |
| 8,490,934 | B2 * | 7/2013 | Dittmer ............... 248/291.1 |
| 8,724,037 | B1 * | 5/2014 | Massey ................ 348/836 |
| 8,746,635 | B2 * | 6/2014 | Kim et al. ............ 248/133 |
| 2002/0043978 | A1 * | 4/2002 | McDonald ............. 324/508 |
| 2002/0100851 | A1 * | 8/2002 | Abramowsky et al. .... 248/284.1 |
| 2004/0084587 | A1 * | 5/2004 | Oddsen ................. 248/284.1 |
| 2006/0070210 | A1 | 4/2006 | Amdahl et al. |
| 2006/0102819 | A1 | 5/2006 | Li |
| 2007/0040084 | A1 | 2/2007 | Sturman et al. |
| 2007/0221807 | A1 | 9/2007 | Park |
| 2007/0252056 | A1 * | 11/2007 | Novin ................. 248/205.1 |
| 2009/0050763 | A1 | 2/2009 | Dittmer |
| 2010/0091438 | A1 | 4/2010 | Dittmer |

* cited by examiner

TELEVISION MOUNT ASSEMBLY

CROSS REFERENCE TO RELATED APPLICATIONS

None.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of television accessories, and more specifically toward a television mount assembly suitable for mounting a television to a wall, especially over fireplaces and other obstacles. The mount assembly secures a television (TV) to a wall via two arms and a spring mechanism thereby allowing it to extend away from the wall while at the same time allowing the television to swivel left and right. It includes a mechanism to straighten the television as it is positioned close to the wall. The spring mechanism is calibrated by means of a calibration screw, spring block, and locking screws. A handle enables a user to grasp the mount assembly for quickly and easily changing the position of the television. A temperature gauge on the handle displays ambient temperature proximate to the television to warn users if the temperature is too high for the television to safely operate. A means of setting a maximum extension prevents the television from extending beyond a point set by the user.

Flat panel televisions continue to grow in popularity, especially as prices decrease and sizes increase. Despite a sluggish economy, one source estimated that 7.2 million flat panel televisions were sold in North America during the first quarter of 2009, an increase of twenty-three percent compared to the first quarter of 2008. Many consumers not only enjoy the superior picture quality often provided by flat panel televisions, but also the ability to mount these televisions on a wall. Mounting a flat panel television on a wall eliminates the previously required floor space to house a television.

Securely mounting flat panel televisions to a wall is an important task, since failure to properly mount a television to a wall can result in the television falling and incurring significant damage. Television mounts are generally bolted directly to studs in the walls to provide adequate support for televisions that can weigh 50 pounds or more. The positioning of the television is preferably in a place that provides good visibility throughout the room. Thus, most flat panel televisions are mounted in highly visible areas that provide adequate support.

Unfortunately, many optimal locations for mounting a television are obstructed by permanent fixtures in the home. For example, a fireplace may be situated in the middle of a wall. While this may be an optimal placement for the fireplace, as it is visible and provides heat more evenly throughout the room, it is also an optimal placement for a flat panel television. Placing the television on either side of the fireplace often prevents users on the opposing side from fully viewing the television. Placing the television above the fireplace had also, previous to this invention, been undesirable. Mounting a flat panel television above the fireplace positions the television extremely high up, causing the users to have to look up to view the television. For periods of extending viewing, such as when watching a moving, this can be uncomfortable and, in extreme cases, lead to injury. Further, the heat produced from a fireplace can damage a television and cause temporary or permanent damage. Relatively high temperatures are encountered directly above the fireplace and next to the chimney. Televisions generally have maximum operating temperatures, and when these temperatures are exceeded, the electronic circuitry can degrade causing problems in performance or even complete failure. Therefore, until this invention, placement of an operating flat panel television above a fireplace has been discouraged.

Thus there has existed a long-felt need for a television mount assembly that can safely and securely mount a flat panel television to a wall over objects such as a fireplace while allowing for optimal viewing throughout a room.

SUMMARY OF THE INVENTION

The current invention provides just such a solution by having a television mount assembly suitable for mounting a television to a wall, especially over fireplaces and other obstacles. The mount assembly secures a television (TV) to a wall via two arms and a spring mechanism thereby allowing it to extend away from the wall while at the same time allowing the television to swivel left and right. It includes a mechanism to straighten the television as it is positioned close to the wall. The spring mechanism is calibrated by means of a calibration screw, spring block, and locking screws. A handle enables a user to grasp the mount assembly for quickly and easily changing the position of the television. A temperature gauge on the handle displays ambient temperature proximate to the television to warn users if the temperature is too high for the television to safely operate. A means of setting a maximum extension prevents the television from extending beyond a point set by the user.

It is a principal object of the invention to provide a television mount assembly capable of mounting a flat panel television over a fireplace.

It is another object of the invention to provide a television mount assembly that allows a flat panel television to be pulled away from a wall and lowered.

It is a further object of the invention to provide a television mount that reduces the chance of damage from heat or physical contact.

It is a final object of this invention to provide a television mount that is easy to operate.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the invention and together with the description, serve to explain the principles of this invention.

DETAILED DESCRIPTION OF THE INVENTION

Figure 1:
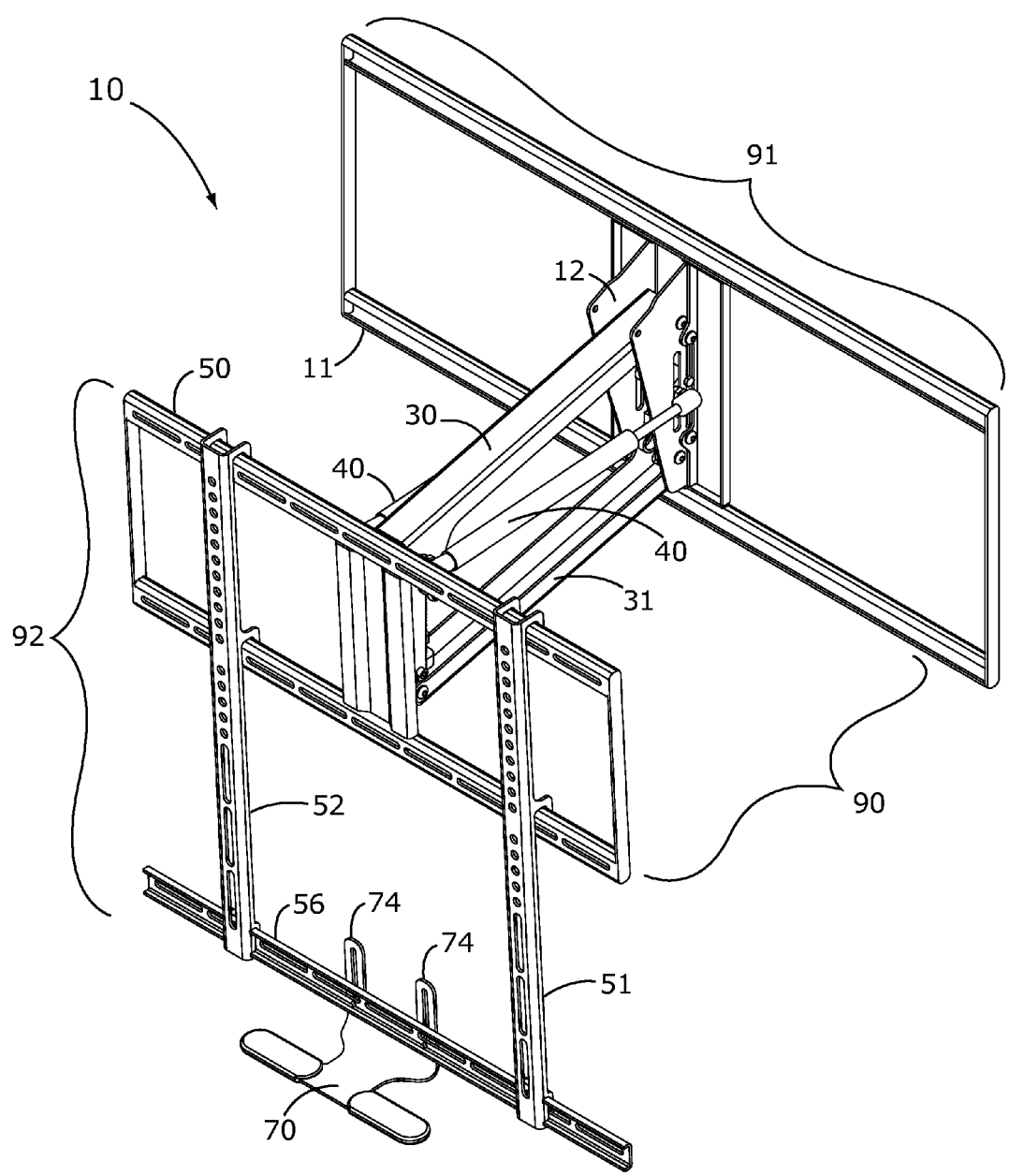
FIG. 1 is a perspective view of a television mount assembly according to an embodiment of the current invention in an extended configuration.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

FIG. 1 is a perspective view of a television mount assembly according to an embodiment of the current invention in an extended configuration. In such a configuration, the television floats away from the wall and in a lower position than the retracted configuration. The television mount assembly 10 includes three major portions: a wall mounting portion 91, an extending portion 90, and a television mounting portion 92. The wall mounting portion 91, which includes a wall mount 11, secures the television mount assembly to a wall or other fixed structure. The television mounting portion 92 secures a television to the television mount assembly 10. The extending portion 90 secures the television mounting portion 92 to the wall mounting portion 91, wherein the extending portion 90 allows the television mounting portion 92 (and thus, the television mounted thereto) to extend away from and retract towards the wall.

The television mounting portion 92 includes a television bracket 50 with a right television mount 51 and a left television mount 52 removably secured thereto. A bottom television mount 56 is secured to the right television mount 51 and the left television mount 52. A handle 70 is slidably attached to the bottom television mount 56 by means of two vertical extensions 74 with slits. The handle 70 is used to extend the television away from and retract the television towards the wall (or other object to which the wall mounting portion is affixed).

The extending portion 90 connects the television bracket 50 of the television mounting portion 92 to the wall mount 11 of the wall mounting portion 91. A wall bracket 12, affixed to the wall mount 11, provides support for an upper arm 30 and a lower arm 31, where the upper arm 30 is longer than the lower arm 31. Gas springs 40 are also secured to the wall bracket 12 by means of a gas spring block (not shown in this figure). The gas springs 40 act as a spring mechanism and provide a counter balancing force to the weight of the television and television mounting portion 92. Without such a counter balancing force, the television mounting portion and television secured thereto would natural fall down and away from the wall mounting portion 91 and be extremely difficult to lift into a retracted configuration.

Figure 2:
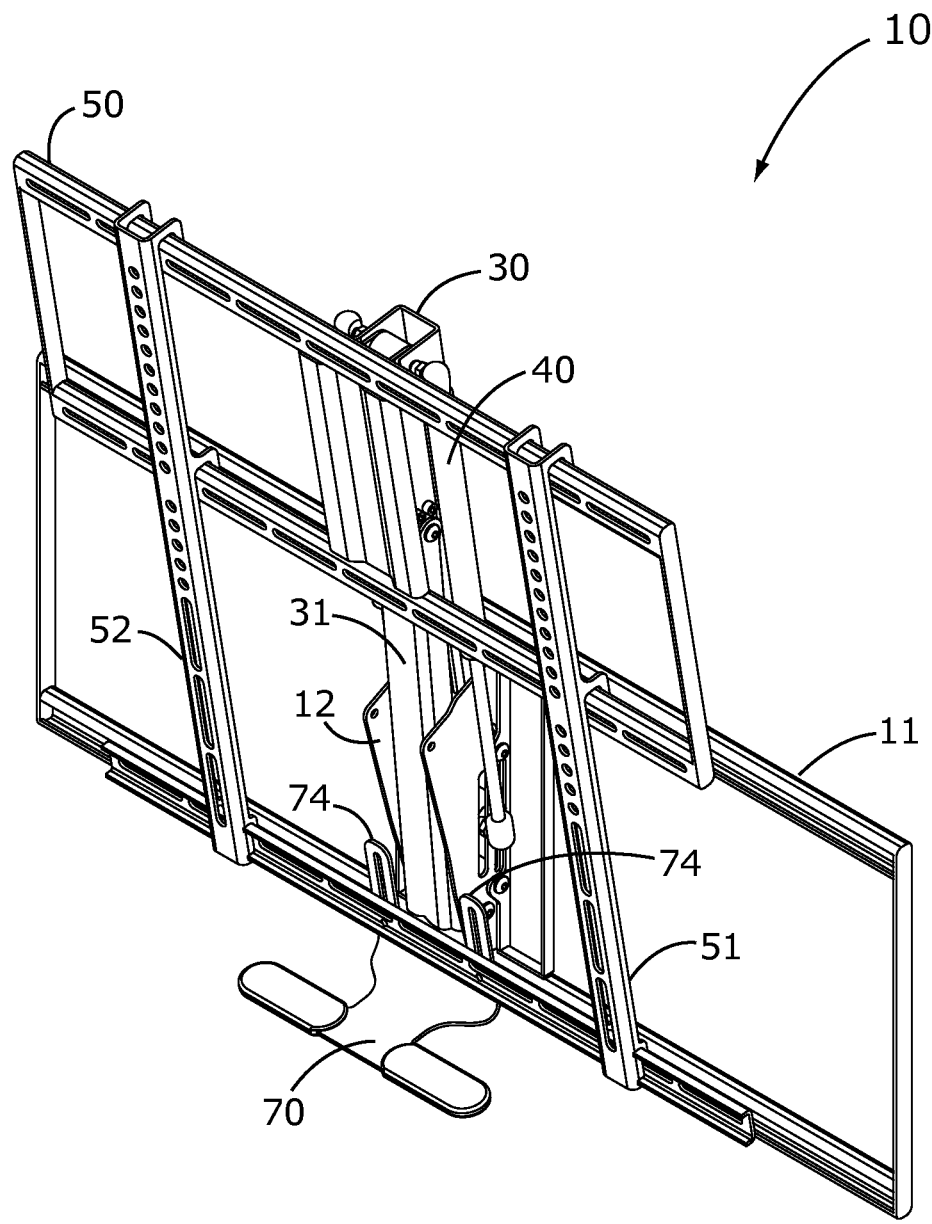
FIG. 2 is a perspective view of the television mount assembly in a retracted configuration.

FIG. 2 is a perspective view of the television mount assembly in a retracted configuration. In such a configuration, the television is adjacent to the wall and in a higher position than the extended configuration. Further, the television mount assembly 10 causes the television to angle slightly downward, compared to its extend configuration, to allow for easier viewing of the television in the retracted position.

Figure 3:
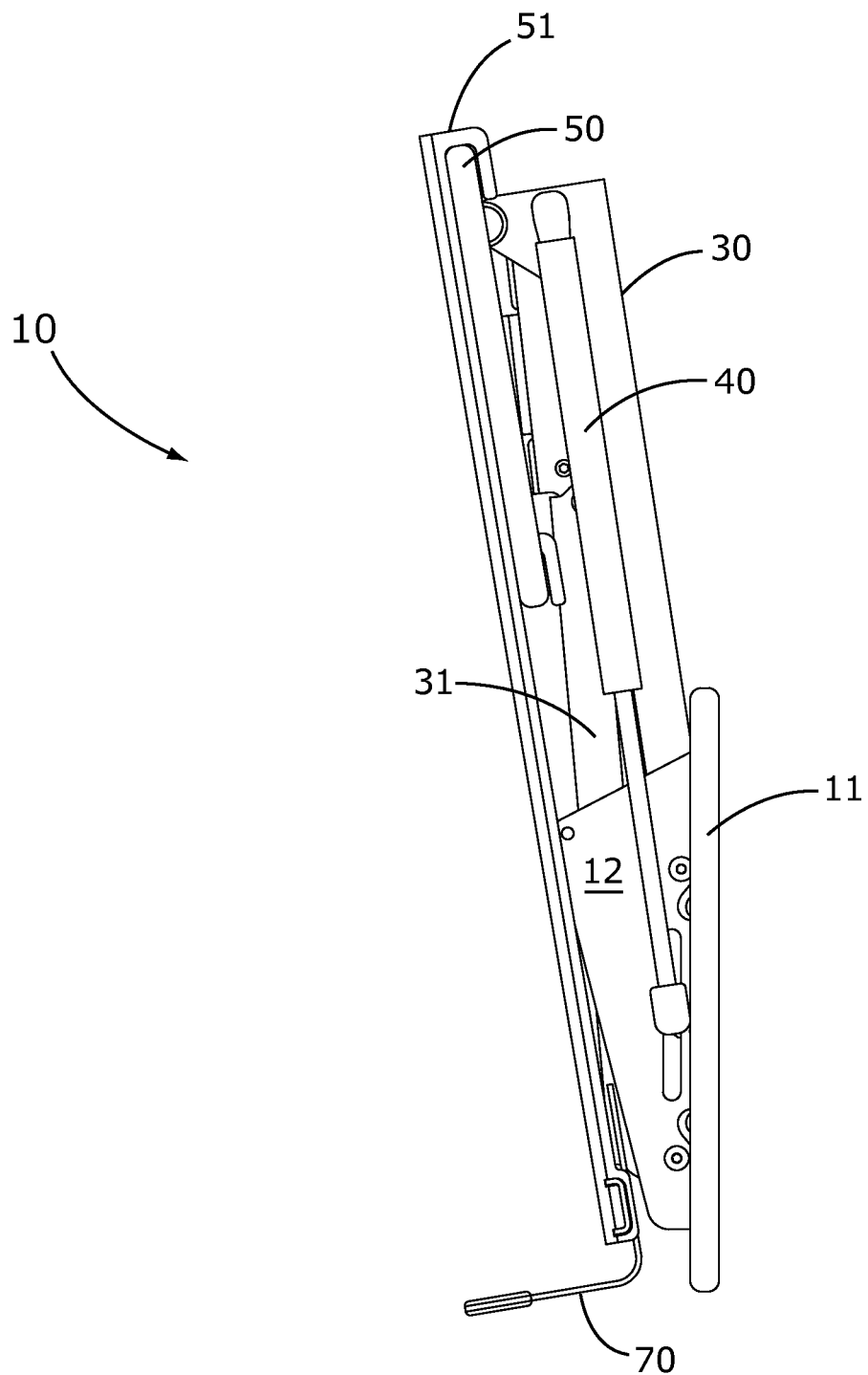
FIG. 3 is a side view of the television mount assembly in a retracted configuration.

FIG. 3 is a side view of the television mount assembly in a retracted configuration. The angle of the television in the retracted position is more clearly shown in this figure. Upper arm 30, because of its length, extends out further than lower arm 31, thereby creating a slight angle in the television bracket 50 that is more pronounced in the retracted configuration than the extended configuration. In one embodiment, the television bracket 50 is angled at ten degrees (10°) in the retracted configuration and three degrees (3°) in the extended configuration. Once placed in the retracted position, the gas springs 40 provide a force to keep the television mount retracted. Gas springs 40 apply an expansive force between the wall bracket 12 and the television bracket side of the upper arm 30. As the length of the gas springs decreases, the expansive force increases.

Figure 4:
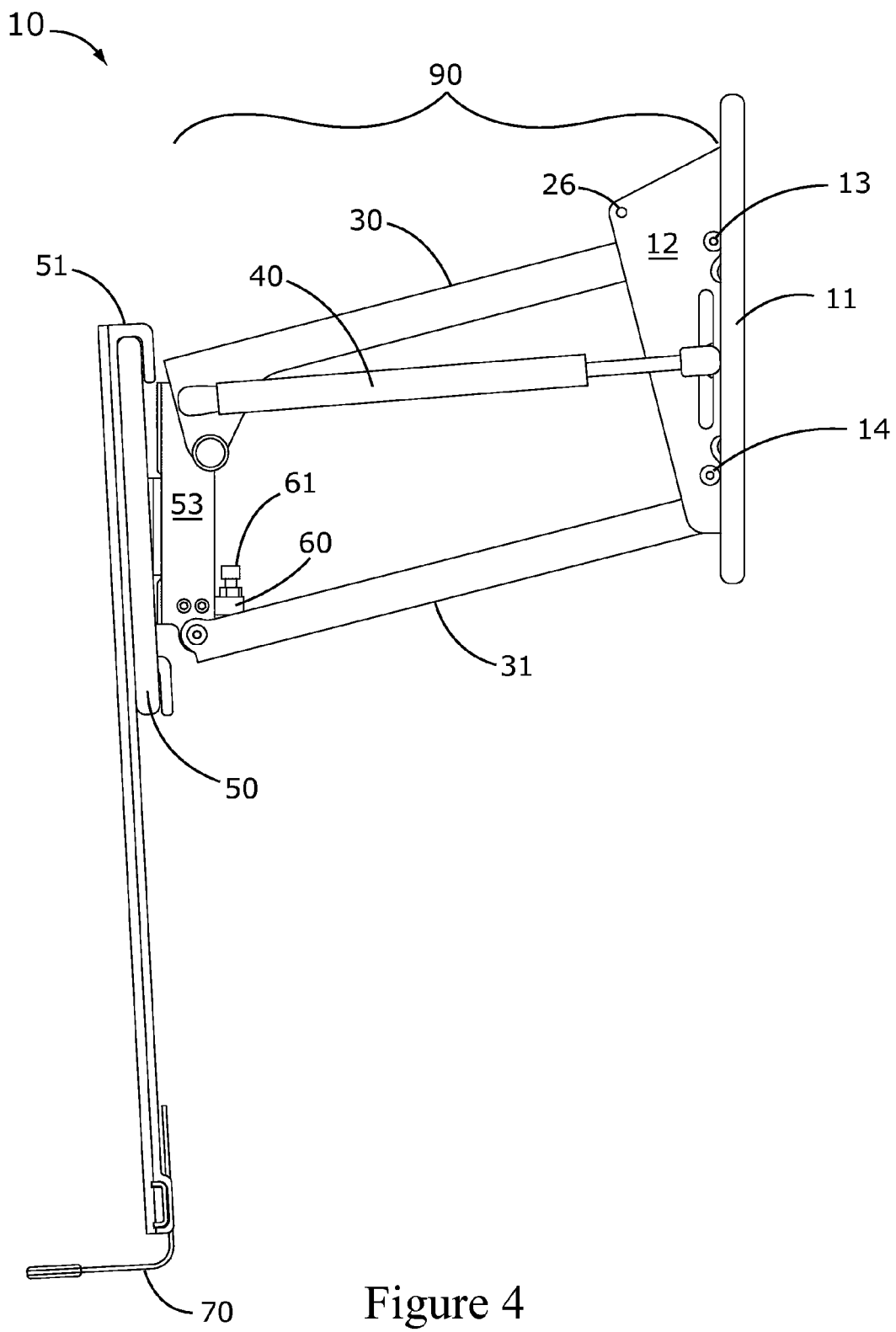
FIG. 4 is a side view of the television mount assembly in an extended configuration.

FIG. 4 is a side view of the television mount assembly in an extended configuration. Upper arm 30 rotates about bolt 13. In use, the weight of a television provides a downward force, parallel to the wall or other structure that the television mount assembly is affixed to, that is transferred to the television bracket side of the upper arm 30. This downward force creates a torque about bolt 13. As the television mount assembly goes from a retracted configuration to an extended configuration, the torque about bolt 13 increases. To balance this increased torque, the gas springs 40 apply an increased force to upper arm 30 as the television mount assembly goes from a retracted configuration to an extended configuration.

Figure 5:
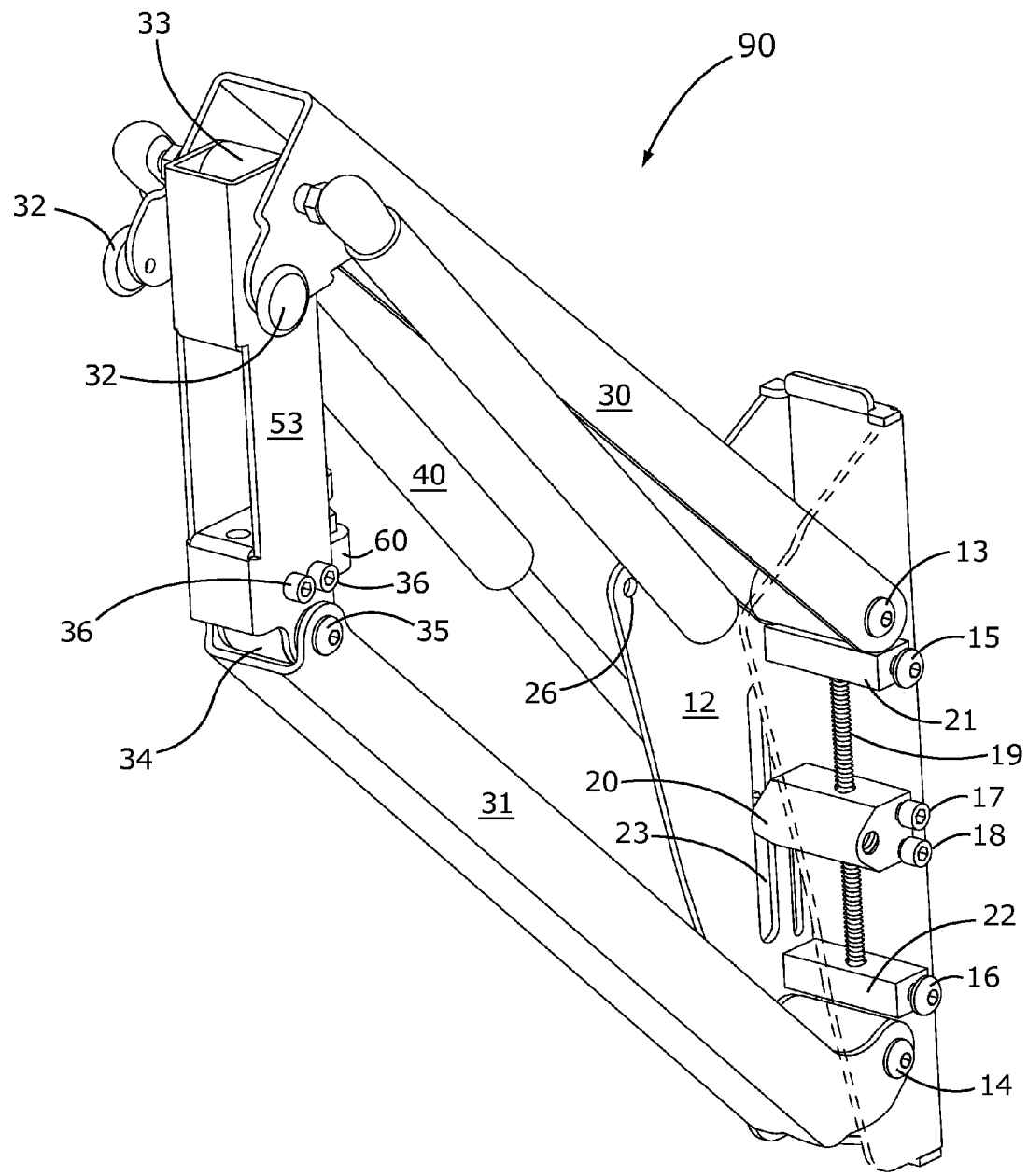
FIG. 5 is a perspective view of the extending portion of the television mount assembly in a partially extended configuration.

FIG. 5 is a perspective view of the extending portion 90 of the television mount assembly in a partially extended configuration. In this figure, wall bracket 12 is only partially drawn to show underlying elements. The wall bracket 12 is secured to the wall mount (not shown in this figure). The wall bracket 12 is connected to upper arm 30 by means of a bolt 13. Lower arm 31 is connected to the wall bracket 12 by means of a bolt 14. At the opposite end of the upper arm 30, gas springs 40 are connected at upper attachment point 33. The opposite ends of the gas springs 40 are secured to a spring block 20 through a slot 23. A calibration screw 19 is used to adjust the position of the spring block 20. By rotating the calibration screw 19, the spring block 20 is moved, at least to some extent, vertically thereby changing the length and angle of the gas springs 40 thereby providing a means of varying the force applied by the spring mechanism. In this manner, televisions of different weights can be accounted for. Raising the spring block 20 decreases the angle of the force applied by the gas springs thereby reducing the torque applied to upper arm 30 about bolt 13. This lower force can be used to support lighter televisions. In a like manner, lowering the spring block 20 can be used to support heavier televisions by increasing the angle of force applied by gas springs 40 to upper arm 30. Once the appropriate position of the spring block 20 is determined, optional upper locking screw 17 and lower locking screw 18 are used to lock the spring block 20 in place and provide added support thereto as well as to reduce thread slip between the calibration screw 19 and the spring block 20. The calibration screw 19 is supported between upper support block 21 and lower support block 22. The calibration screw 19 is allowed to rotate axially between the upper support block 21 and lower support block 22, but is restrained from any vertical movement to provide the proper support for the spring block 20. Moving the spring block 20 vertically, as used herein, is intended to mean that the spring block is moved at least partially in the vertical axis; some amount of horizontal movement may be associated with the vertical movement of the spring block 20. Upper support block 21 and lower support block 22 are secured to the wall bracket 12 by means of bolts 15 and 16.

Upper arm 30 includes two protrusions 32 on the side closest to the television bracket 50 (not shown in this figure). These protrusions, explained in more detail below, straighten the television before the television mounting assembly is in fully retracted configuration. The same end of the upper arm 30 is connected at the upper attachment point 33 to a rotation block 53, preferably by means of a bolt 37 (shown in FIG. 7) that travels from one gas spring 40, through one side of the upper arm 30, through the rotation block 53, through the other side of the upper arm 30, and to the other gas spring 40. The rotation block 53, in turn, is rotationally secured to the television bracket 50 (not shown in this figure). This allows the television bracket 50, and associated television, to rotate (or swivel) left and right about a vertical or semi-vertical axis as desired by the user. The bottom of the rotation block 53 is secured to the lower arm 30 on the side closest to the television bracket 50 at the lower attachment point 34. The preferable means of attachment at lower attachment point 34 is a bolt 35. The opposite end of the lower arm 30 is secured to the wall bracket 12 by a bolt 14.

Figure 6:
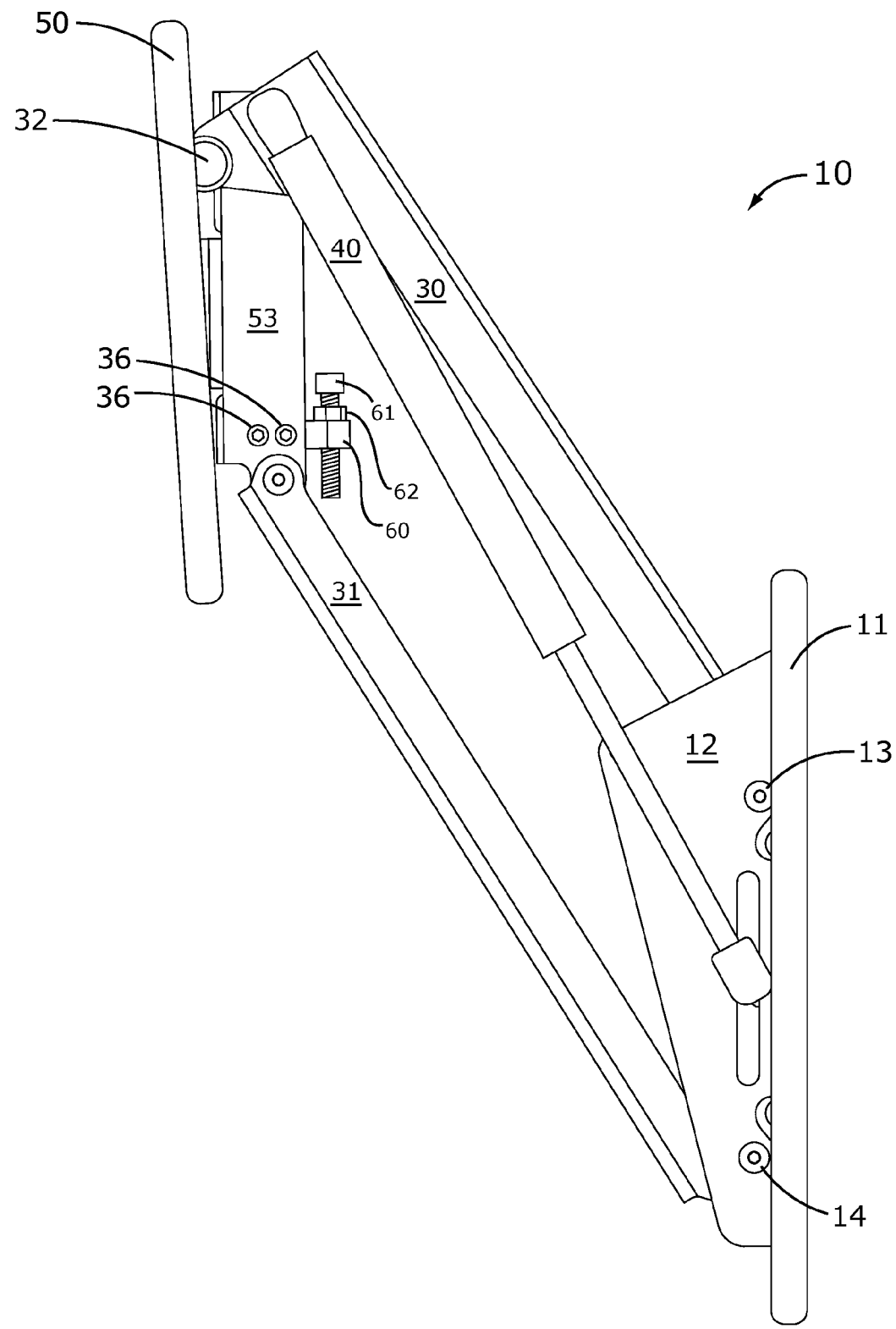
FIG. 6 is a side view of the television mount assembly in a partially extended configuration.

FIG. 6 is a side view of the television mount assembly in a partially extended configuration. The television bracket 50 is rotationally secured to the rotation block 53. In this figure, the protrusions 32 of the upper arm 30 are shown approaching the television bracket 50. As the television mount assembly 10 goes from an extended configuration to a retracted configuration, the protrusions 32 approach the television bracket 50. If the television is rotated left or right, the side closest to the wall mount 11 will engage the protrusion 32 of the upper arm 30 of that same side. This will apply a force to the television bracket 50 thereby causing the television bracket 50 to rotate away from the wall mount 11 and straighten out into a position that is parallel with wall mount 11. This prevents the television from striking the wall or other object to which the television mount assembly 10 is secured. In a preferred embodiment, the protrusions 32 are wheels that provide for a more gentle engagement of the wall mount 11.

The extending portion 90 of the television mount assembly 10 includes a means for setting a maximum extension. Without a means to set a maximum extension, users could extend the television to a non-desirable position. To this end, the current invention includes an adjustment collar 60, an adjustment screw 61, and a locking nut 62. The adjustment collar 60 is secured to the rotation block 53. The adjustment screw 61 rotates through the adjustment collar 60 and by rotating the adjustment screw 61, the relative vertical position of the adjustment screw 61 to the adjustment collar 60 is changed. As the television mount assembly goes from a retracted configuration to an extended configuration, the bottom of the adjustment screw 61 approaches and engages the lower arm 31. When the adjustment screw 61 engages the lower arm 31, it prevents further extension of the extending portion 90. In this manner, a user can vary and set the maximum extension of the television mount assembly 10 and thus the lowest vertical position of the television secured thereto. The locking nut 62 is used to resist the rotation of the adjustment screw 61 and lock the adjustment screw 61 in place. The adjustment collar 60 is attached to the rotation block 53 by means of bolts 36.

Figure 7:
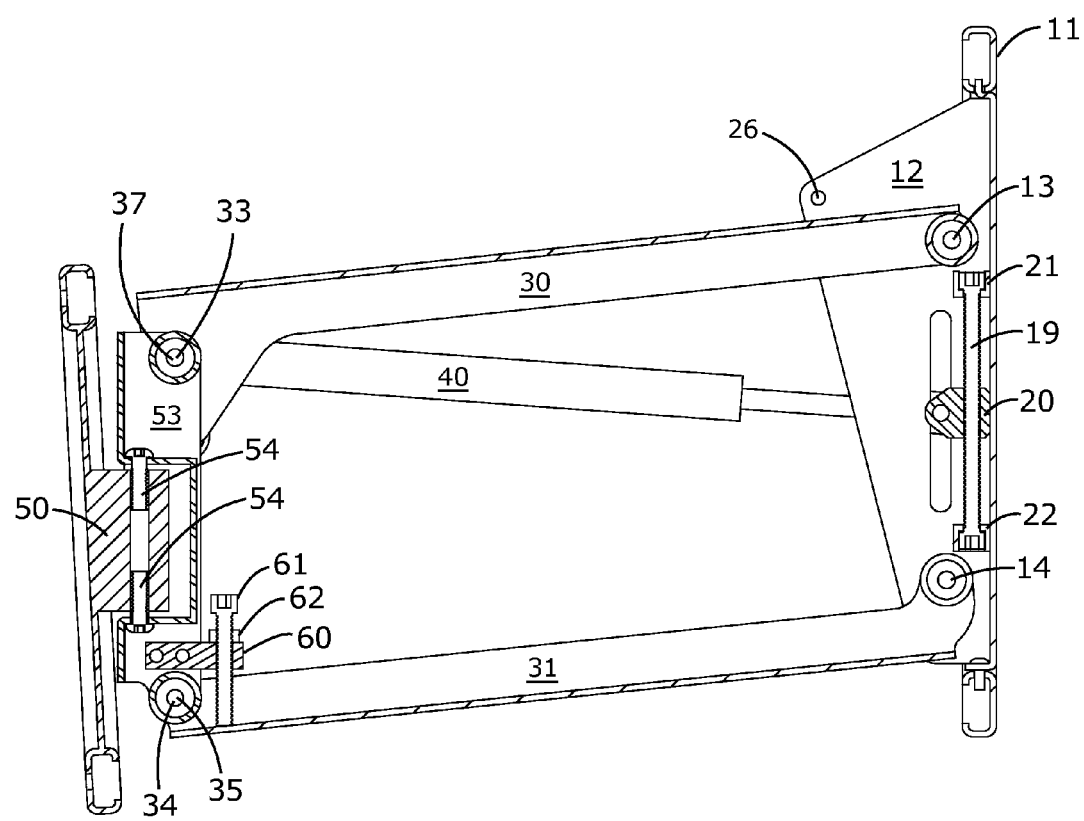
FIG. 7 is a cutaway side view of the television mount assembly in an extended configuration.

FIG. 7 is a cutaway side view of the television mount assembly in an extended configuration. This figure shows the adjustment screw 61 engaging the lower arm 31 to prevent further extension of the extending portion 90. Pivot screws 54 are also shown, where the pivot screws 54 secure the television bracket 50 to the rotation block 53. The pivot screws 54 enable the television bracket 50 to rotate left and right as desired by the user. The extent of rotation is dependent upon the exact shape and dimensions of the television bracket and rotation block, though it is preferably at least twenty degrees (20°) in either direction. Holding bolt hole 26 accepts a holding bolt (not shown in this figure). The holding bolt is used prevent the upper arm 30 from retracting towards the wall mount 11 or the lower arm 31 from extending away from the wall mount 11.

Figure 8:
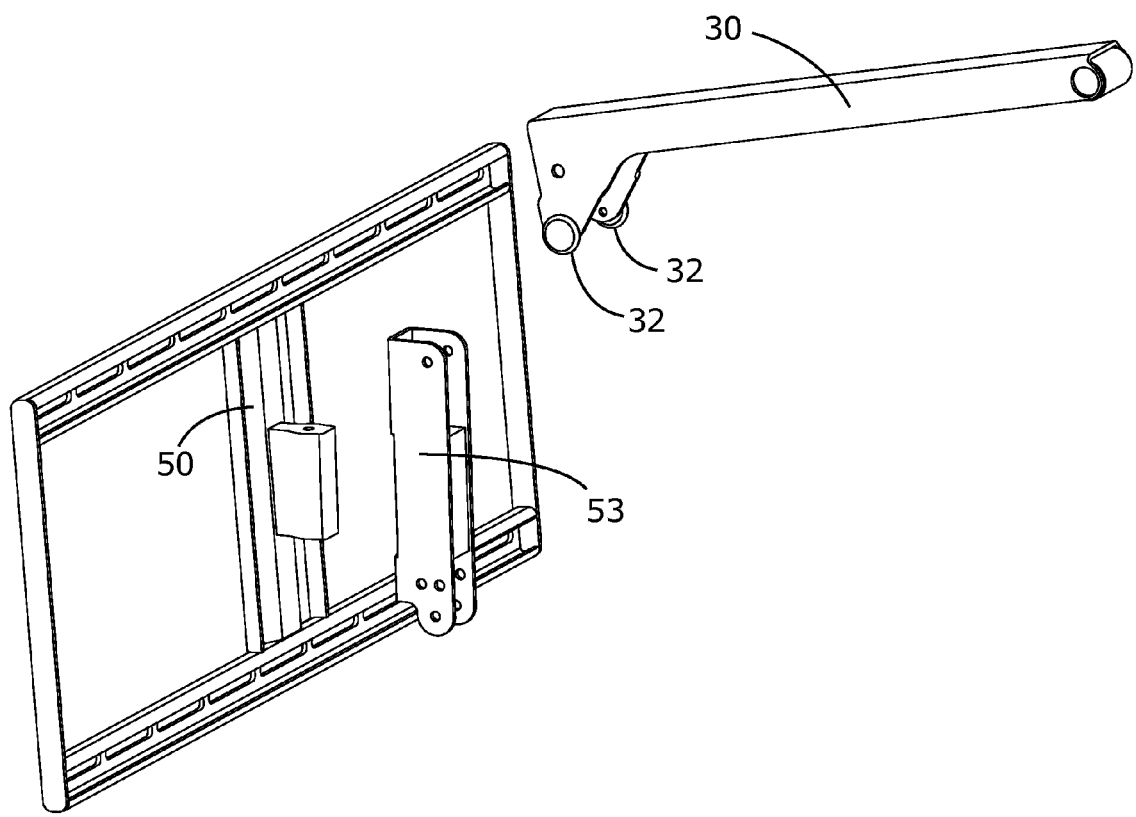
FIG. 8 is an exploded perspective view of the upper arm, rotation block, and television bracket.

FIG. 8 is an exploded perspective view of the upper arm, rotation block, and television bracket. The upper arm 30 includes two protrusions 32 that do not engage the television bracket 50 when television mount assembly 10 is in the extended position.

Figure 9:
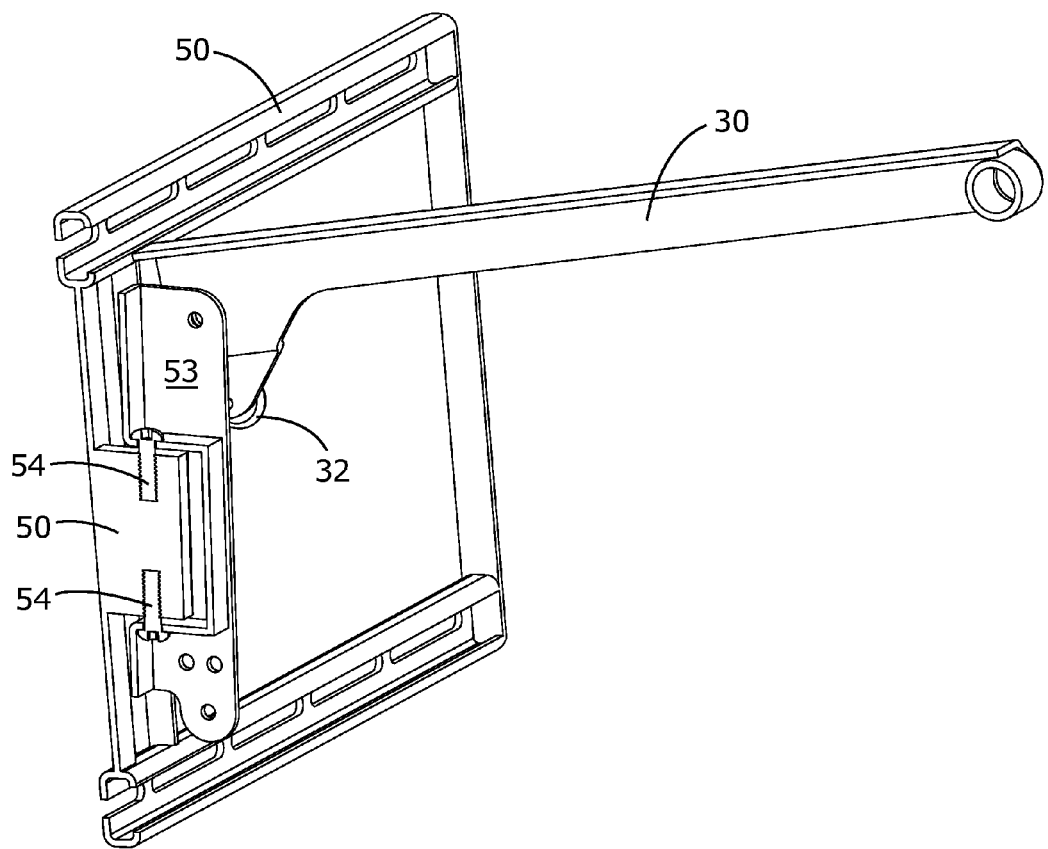
FIG. 9 is a cutaway perspective view of the upper arm, rotation block, and television bracket in an extended configuration.

FIG. 9 is a cutaway perspective view of the upper arm, rotation block, and television bracket in an extended configuration. The upper arm 30 is connected to the rotation block 53, which in turn is connected to the television bracket 50 by two pivot screws 54.

Figure 10:
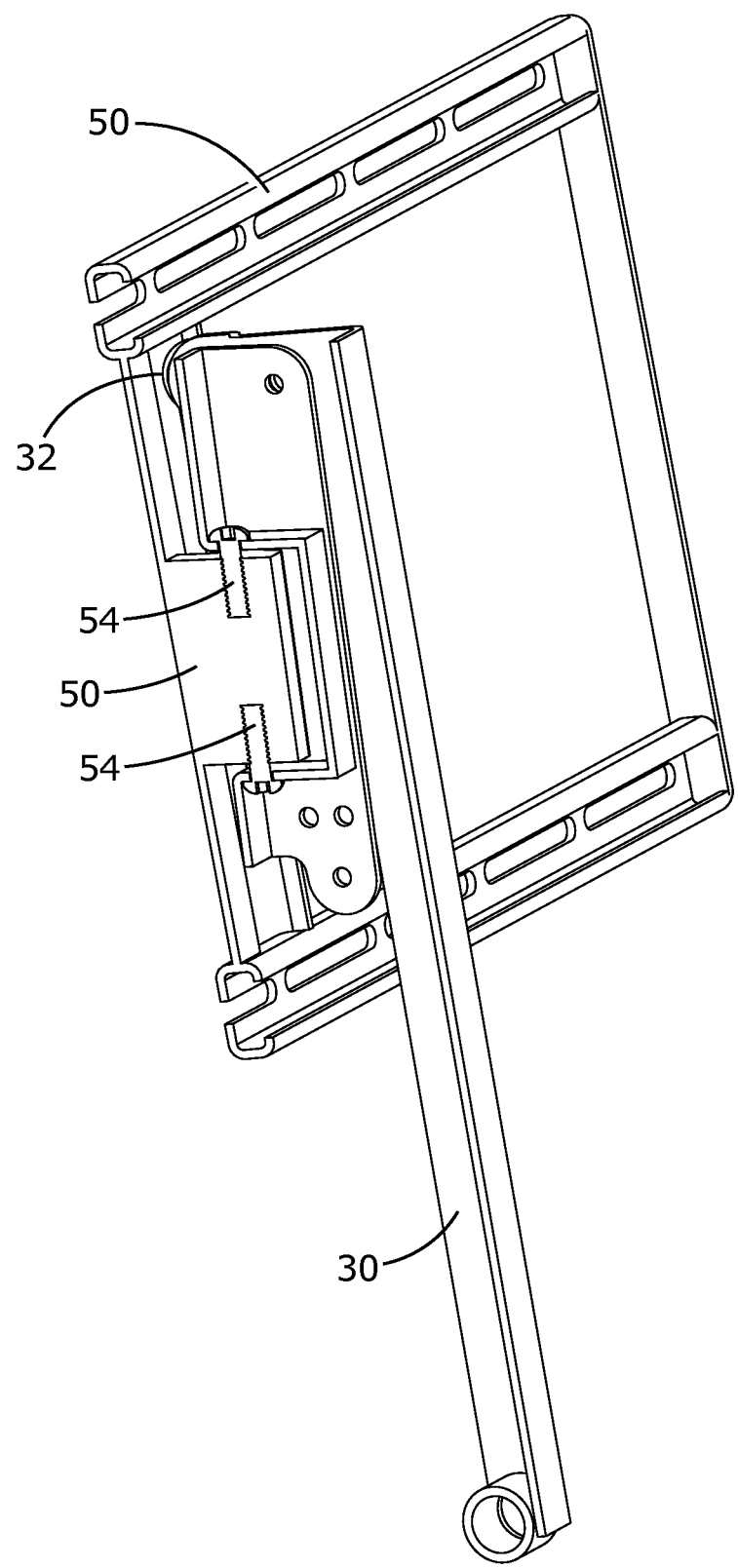
FIG. 10 is a cutaway perspective view of the upper arm, rotation block, and television bracket in a retracted configuration.

FIG. 10 is a cutaway perspective view of the upper arm, rotation block, and television bracket in a retracted configuration. The upper arm 30 is connected to the rotation block 53, which in turn is connected to the television bracket 50 by two pivot screws 54. In the retracted configuration, the protrusions 32 of the upper arm 30 engage the television bracket 50 forcing it parallel to the wall mount 11 (not shown in this figure).

Figure 11:
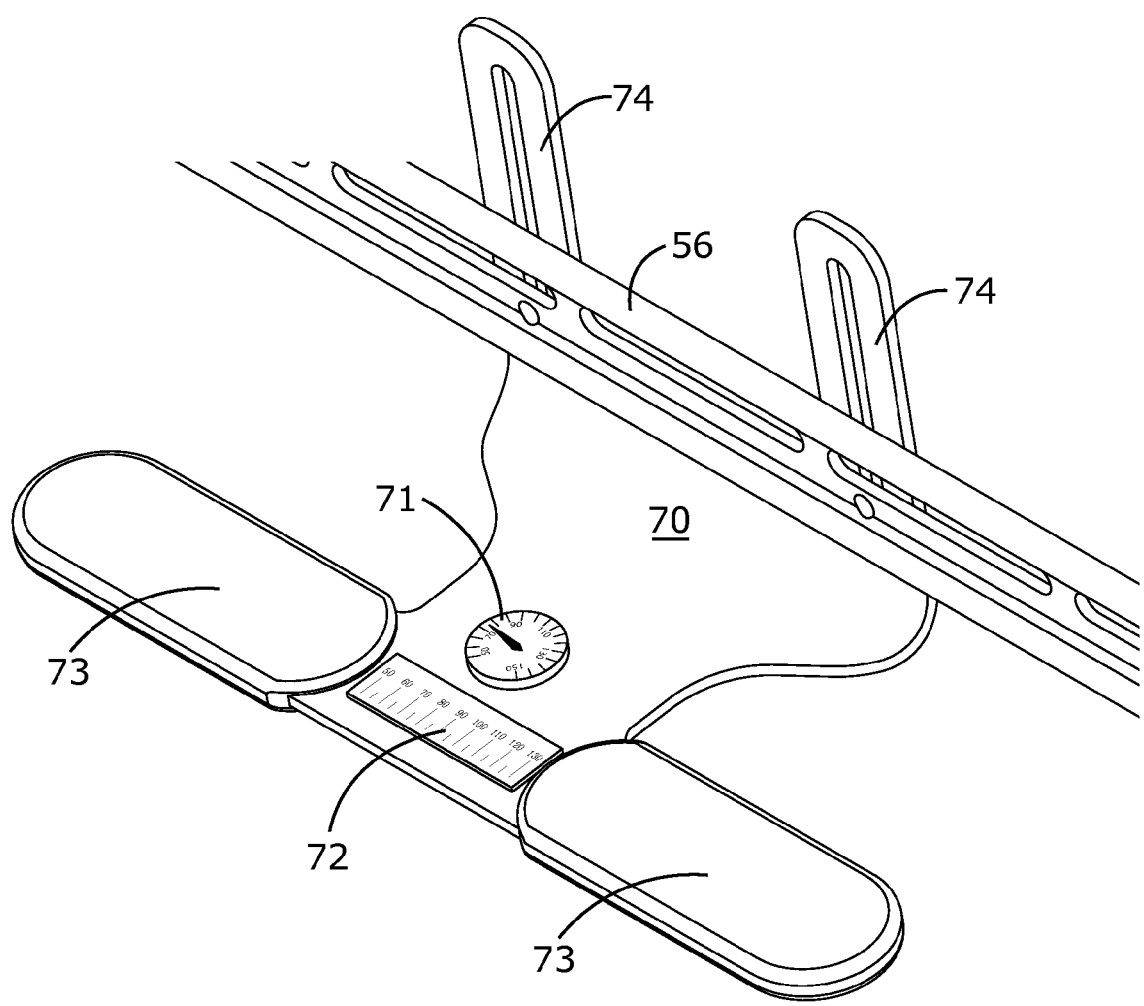
FIG. 11 is a close-up perspective view of the lower part of the television mounting portion.

FIG. 11 is a close-up perspective view of the lower part of the television mounting portion. The handle 70 is connected to the bottom television mount 56 via two vertical extensions 74. The two vertical extensions 74 allow the handle 70 to be secured higher or lower relative to the bottom television mount 56 to allow for smaller or larger televisions. The handle 70 includes a thermometer or temperature gauge. The temperature gauge on the handle displays the ambient temperature proximate to the television to warn users if the temperature is too high for the television to safely operate. In one embodiment, there is a radial thermometer 71, whereby a dial displays the current ambient temperature near the television to the user. In an alternative embodiment, there is a color changing temperature gauge 72. The color changing temperature gauge comprises a temperature sensitive material that changes color depending upon the ambient temperature. This enables viewing of the current temperature from a distance. In yet another alternative, the temperature gauge is a digital thermometer with an LCD display. The handle 70 also includes two padded portions 73. In addition to or as an alternative of a temperature gauge, the padded portions 73 are made from color-changing temperature-sensitive material. The composition of the material of the padded portions 73 is such that it changes color at predetermined temperatures. For example, the padded portions may turn from black to red if the temperature is at or above the normal operating range of temperatures of flat panel televisions.

Figure 12:
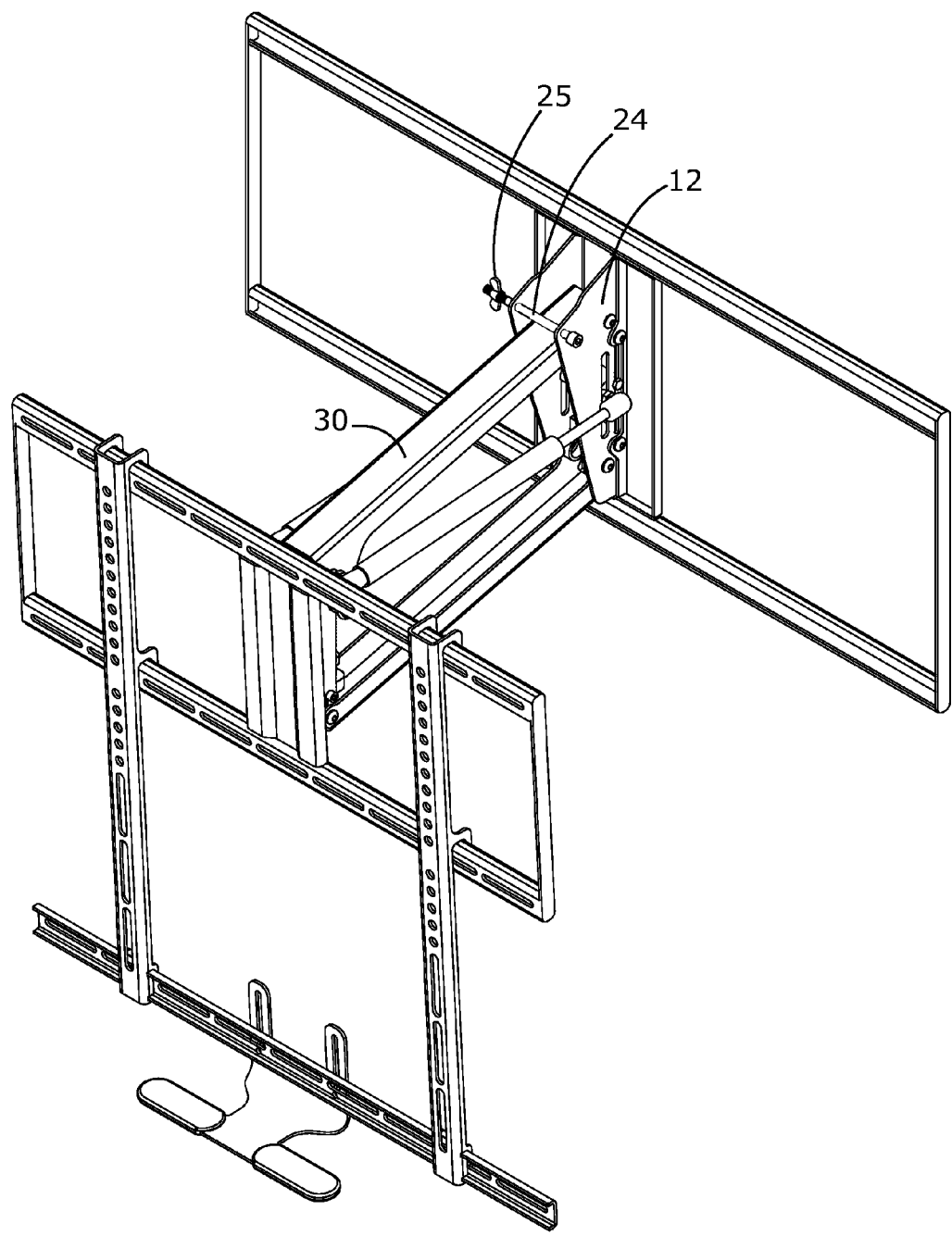
FIG. 12 is a perspective view of the television mount assembly in a locked extended configuration.

FIG. 12 is a perspective view of the television mount assembly in a locked extended configuration. A holding bolt 24 is secured to the wall bracket 12 by means of a wing nut 25. The holding bolt 24 prevents the upper arm 30 from retracting towards the wall. The holding bolt can be secured by other means, such as nuts, locking pins, and spring-loaded flanges.

Figure 13:
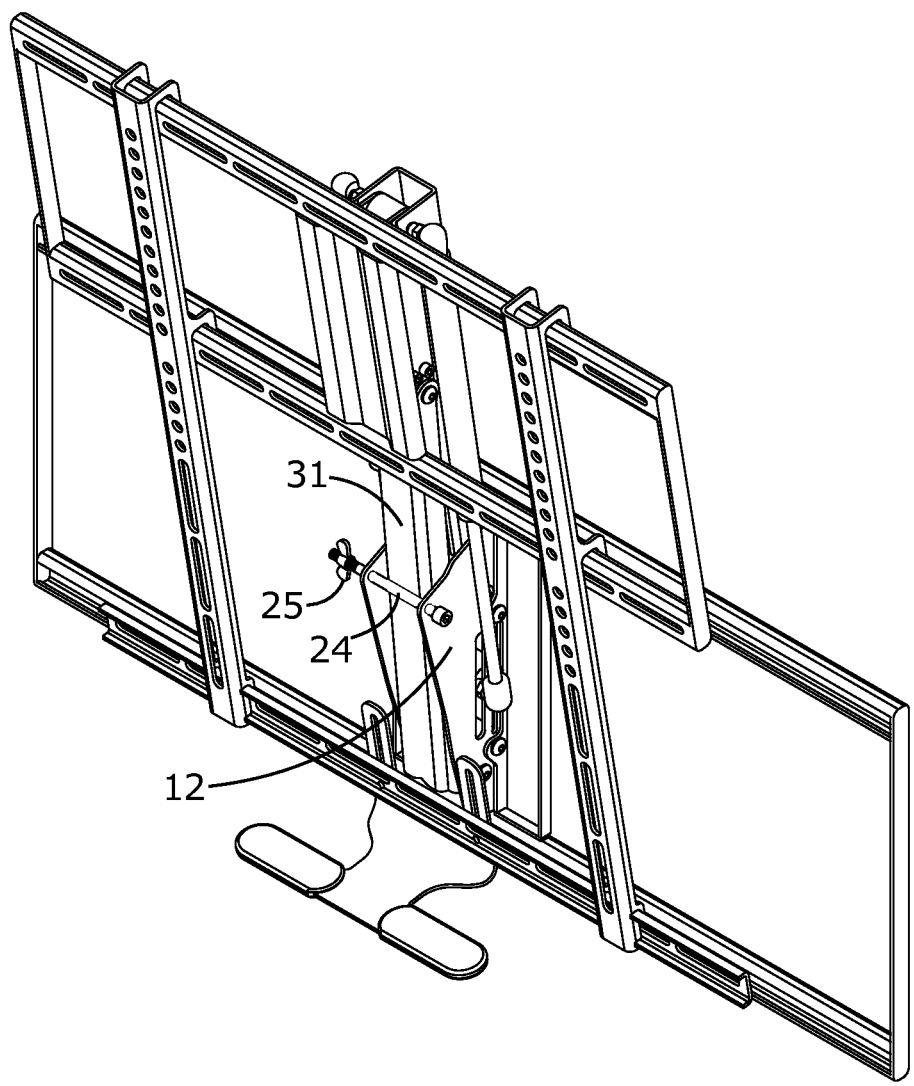
FIG. 13 is a perspective view of the television mount assembly in a locked retracted configuration.

FIG. 13 is a perspective view of the television mount assembly in a locked retracted configuration. In this figure, the holding bolt 24 is secured to the wall bracket 12 by means of a wing nut 25 to prevent the lower arm 31 from extending away from the wall.

Figure 14:
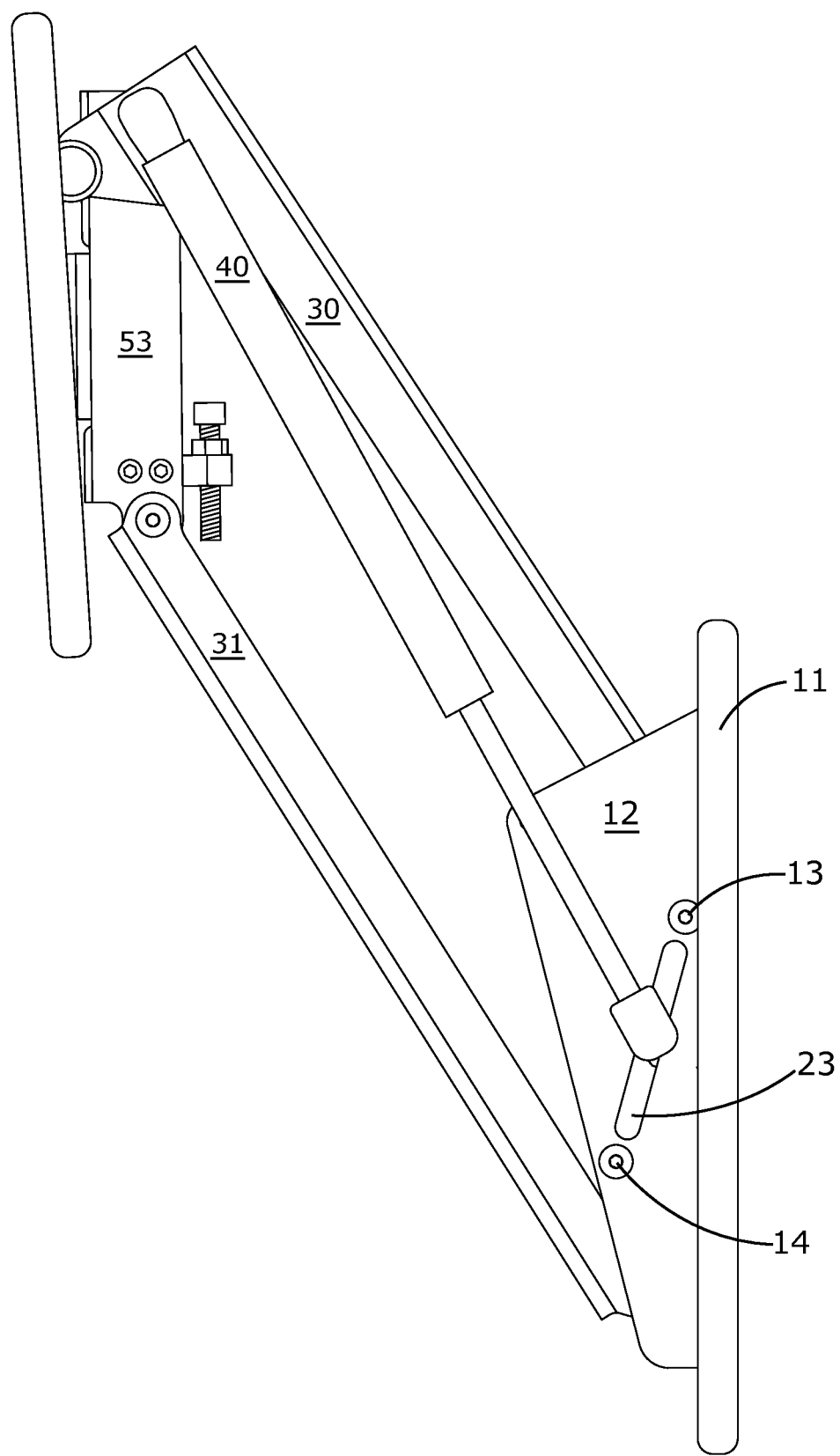
FIG. 14 is a side view of the television mount assembly in a partially extended configuration according another embodiment of the current invention.

FIG. 14 is a side view of the television mount assembly in a partially extended configuration according another embodiment of the current invention. In this embodiment, the wall bracket 12 has an angled slot 23, wherein the gas springs 40 connect to the spring block 20 (not shown in this figure) therethrough. The spring block 20 is adjusted by angled calibration screw 19 (not shown in this figure). The gas springs 40 can apply a greater torque on upper arm 30 about bolt 13 as the angle between the gas springs 40 and upper arm 30 increase. As stated earlier, varying the torque applied to upper arm 30 allows for televisions of different weights to be properly balanced using the current invention. By angling the calibration screw and slot 23, greater variations in torque on upper arm 30 are achieved thus allowing for a wider variation in television weights supported by the current invention.

The television mount assembly is installed by attaching the wall mount to a wall or other object. In a preferred embodiment, the television mount assembly is secured to the studs of a wall by means of bolts. A television is secured to the right television mount and the left television mount, and the right and left television mounts are then secured to the television bracket, preferably by hanging it on the bracket and then securing it with screws, bolts, or the like. The maximum extension of the television mount assembly is adjusted by rotating the adjustment screw. The force applied by the gas springs is adjusted by rotating the calibration screw to raise or lower the spring block. The gas springs provide a balancing force to the weight of the television and television mount assembly.

To use the television mount assembly, a user pulls down on the handles to pull the television away from the wall and into the extended configuration. The user can also pull and push on the handles to rotate the television left or right once the television mount assembly is in the extended position. Pushing up on the handle will return the television mount assembly into the retracted position. While being retracted, protrusions, preferably wheels, on the upper arm rotate the television such that it is parallel to the wall to which the television mount assembly is affixed. In either configuration, a user may view the current ambient temperature near the television by looking at the temperature gauge on the handle.

Mechanical springs, or other like devices, can be used in place of the gas springs; however, they should provide the appropriate balance force while the television mount assembly is in both the retracted configuration and the extended configuration.

The various elements described herein are preferably made from metal materials; however, plastics and carbon fiber materials are also contemplated. In any event, the materials used for the elements described herein must have the requisite compressive and tensile strengths to support a television extended away from a wall or other like structure.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

That which is claimed:

1. A device comprising:
a wall mounting portion, an extending portion, and a television mounting portion,
where the wall mounting portion is attached to the extending portion, where the extending portion is rotatably attached to the television mounting portion,
where the extending portion positions the television mounting portion down and away from the wall mounting portion, referred to as the extended configuration, and where the extending portion positions the television mounting portion up and towards the wall mounting portion, referred to as the retracted configuration,
where the extending portion comprises an upper arm, a lower arm, two gas springs, a spring block, a calibration screw, an adjustment screw, and an adjustment collar, where the upper arm comprises a plurality of wheels, where the wheels of the upper arm engage the television mounting portion in the retracted configuration, where the spring block moves vertically when the calibration screw is rotated, where the two gas springs are connected to the spring block, where the adjustment screw directly engages and comes in contact with the lower arm in the extended configuration, and
where the television mounting portion comprises a handle, where the handle comprises a temperature gauge.

2. The device of claim 1, wherein the extending portion further comprises a locking nut, where the locking nut resists the rotation of the adjustment screw.

3. A device comprising:
a wall mounting portion, an extending portion, and a television mounting portion,
where the wall mounting portion is attached to the extending portion, where the extending portion is attached to the television mounting portion,
where the extending portion comprises an upper arm, a lower arm, a spring mechanism, a means of varying the force applied by the spring mechanism, and a means for setting a maximum extension, where the upper arm comprises a longitudinal axis and a plurality of protrusions, where the plurality of protrusions project away from the longitudinal axis, where the upper arm and the lower are each secured to the wall mounting portion and the television mounting portion, where the longitudinal axis of the upper arm extends between where the upper arm is secured to the wall mounting portion and where the upper arm is secured to the television mounting portion, and
where the extending portion positions the television mounting portion down and away from the wall mounting portion, referred to as the extended configuration, and where the extending portion positions the television mounting portion up and towards the wall mounting portion, referred to as the retracted configuration, wherein the plurality of protrusions of the upper arm force the television mounting portion in the retracted configuration to rotate the television mounting portion left or right about a vertical or semi-vertical axis and straighten out the television mounting portion.

4. The device of claim 3, wherein the spring mechanism further comprises two gas springs.

5. The device of claim 3, wherein the means of varying the force applied by the spring mechanism comprises a spring block and a calibration screw, where the spring block moves vertically when the calibration screw is rotated, where the spring mechanism is connected to the spring block.

6. The device of claim 3, wherein the extending portion is rotatably attached to the television mounting portion.

7. The device of claim 3, wherein the means for setting a maximum extension comprises an adjustment collar and an adjustment screw, where the adjustment screw directly engages and comes in contact with the lower arm when in the extended configuration.

8. The device of claim 7, wherein the means for setting a maximum extension further comprises a locking nut.

9. The device of claim 7, further comprising a holding bolt, wherein the holding bolt prevents the extending portion from extending when the device is in a retracted configuration, and wherein the holding bolt prevents the extending portion from retracting when in the extended configuration, where the holding bolt is secured to the wall mounting portion.

10. The device of claim 3, where the television mounting portion comprises a handle, where the handle comprises a temperature gauge.

11. The device of claim 10, wherein the temperature gauge is a color changing temperature gauge.

12. The device of claim 3, wherein the television mounting portion further comprises a handle, a right television mount, a left television mount, and a bottom television mount, where the bottom television mount is secured to the right television mount and the left television mount, where the handle is secured to the bottom television mount.

13. The device of claim 3, wherein the wall mounting portion further comprises a holding bolt and a wing nut.

14. The device of claim 13, wherein the holding bolt prevents the extending portion from extending when the device is in a retracted configuration, and wherein the holding bolt prevents the extending portion from retracting when in the extended configuration.

15. The device of claim 3, wherein each of the protrusions of the upper arm is capable of engaging the television mounting portion.

16. A device comprising:
a wall mounting portion,
an extending portion, and a television mounting portion, where the extending portion is attached to the television mounting portion,
where the extending portion comprises an upper arm, a lower arm, and a spring mechanism, where the upper arm comprises a longitudinal axis and a plurality of protrusions, where the plurality of protrusions project away from the longitudinal axis, and
where the extending portion has an extended configuration in which the television mounting portion is positioned down and away from the wall mounting portion and a retracted configuration in which the television mounting portion is positioned up and towards the wall mounting portion, wherein the extending portion is rotatably attached to the television mounting portion, and wherein the protrusions of the upper arm force the television mounting portion in the retracted configuration to rotate the television mounting portion about a vertical or semi-vertical axis.

17. The device of claim 16, wherein the protrusions are wheels.

18. The device of claim 16, wherein the spring mechanism further comprises two gas springs.

19. The device of claim 16, wherein the extending portion further comprises a spring block and a position screw shaft, where the spring block moves vertically when the position screw shaft is rotated, where the spring mechanism is connected to the spring block.

20. The device of claim 16, wherein the extending portion further comprises an adjustment collar and an adjustment screw.

21. The device of claim 20, wherein the adjustment screw directly engages and comes in contact with the lower arm in the extended configuration.

* * * * *